United States Patent
Croak et al.

(10) Patent No.: US 8,437,246 B1
(45) Date of Patent: May 7, 2013

(54) METHOD AND APPARATUS FOR PROVIDING INTERNET PROTOCOL CALL SIGNALING NETWORK ASSURANCE

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 467 days.

(21) Appl. No.: 11/323,025

(22) Filed: Dec. 30, 2005

(51) Int. Cl.
*G06F 11/00* (2006.01)

(52) U.S. Cl.
USPC .......... 370/216; 370/229; 370/235; 379/9.03; 379/9.04; 379/14; 379/15.01; 379/32.01; 709/223; 709/224

(58) Field of Classification Search ............... 379/27.02, 379/27.03, 27.04, 1.01–35, 67.1–88.28, 111–112.1, 379/201.01, 219–337, 350–386; 340/3.1–3.32, 340/500–534; 370/351–356, 216–253, 259–271, 370/229–258; 709/201–248; 348/14.01–14.16; 455/423–425; 702/57–126
See application file for complete search history.

(56) References Cited

U.S. PATENT DOCUMENTS

| | | | | | |
|---|---|---|---|---|---|
| 5,473,596 | A | * | 12/1995 | Garafola et al. | 370/241 |
| 5,680,390 | A | * | 10/1997 | Robrock, II | 370/229 |
| 5,757,774 | A | * | 5/1998 | Oka | 370/242 |
| 5,832,197 | A | * | 11/1998 | Houji | 714/4.3 |
| 5,917,898 | A | * | 6/1999 | Bassa et al. | 379/133 |
| 5,930,707 | A | * | 7/1999 | Vambaris et al. | 455/424 |
| 5,938,786 | A | * | 8/1999 | Gregg | 714/748 |
| 6,115,393 | A | * | 9/2000 | Engel et al. | 370/469 |
| 6,215,867 | B1 | * | 4/2001 | Eslambolchi | 379/229 |
| 6,239,699 | B1 | * | 5/2001 | Ronnen | 340/517 |
| 6,332,072 | B1 | * | 12/2001 | Johnson et al. | 455/277.1 |
| 6,459,902 | B1 | * | 10/2002 | Li et al. | 455/453 |
| 6,526,025 | B1 | * | 2/2003 | Pack | 370/252 |
| 6,788,933 | B2 | * | 9/2004 | Boehmke et al. | 455/423 |
| 6,993,013 | B1 | * | 1/2006 | Boyd | 370/352 |
| 7,596,094 | B2 | * | 9/2009 | Puppa et al. | 370/242 |
| 2003/0223746 | A1 | * | 12/2003 | Belhadj-Yahya et al. | 398/27 |
| 2004/0208186 | A1 | * | 10/2004 | Eichen et al. | 370/401 |

* cited by examiner

*Primary Examiner* — Hemant Patel

(57) ABSTRACT

A method and apparatus for alarming on all signaling protocol messages that fail in substantial numbers on any particular routes within an IP network are disclosed. For example, upon receiving these alarms, the network will attempt to identify, and to correct the error producing conditions to prevent further call signaling message failures.

15 Claims, 4 Drawing Sheets

METHOD AND APPARATUS FOR PROVIDING INTERNET PROTOCOL CALL SIGNALING NETWORK ASSURANCE

The present invention relates generally to communication networks and, more particularly, to a method and apparatus for providing Internet Protocol call signaling network assurance in communication networks, e.g., packet networks such as Voice over Internet Protocol (VoIP) networks.

BACKGROUND OF THE INVENTION

Calls originating in a VoIP network and destined for a Public Switched Telephone Network (PSTN) endpoint must traverse many network elements in a network before they are successfully established. Network service providers usually provide stringent monitoring and alarming capabilities of network conditions and events that may impact call processing as these calls traverse from an edge network element of a VoIP network to a PSTN. However, many error producing events do occur within the Internet Protocol (IP) network portion of these calls.

Therefore, a need exists for a method and apparatus for providing Internet Protocol call signaling network assurance in a packet network, e.g., a VoIP network.

SUMMARY OF THE INVENTION

In one embodiment, the present invention provides a method for alarming on all signaling protocol messages that fail in substantial numbers on any particular routes within the IP network. For example, upon receiving these alarms, the network will attempt to identify, and to correct the error producing conditions to prevent further call signaling message failures.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
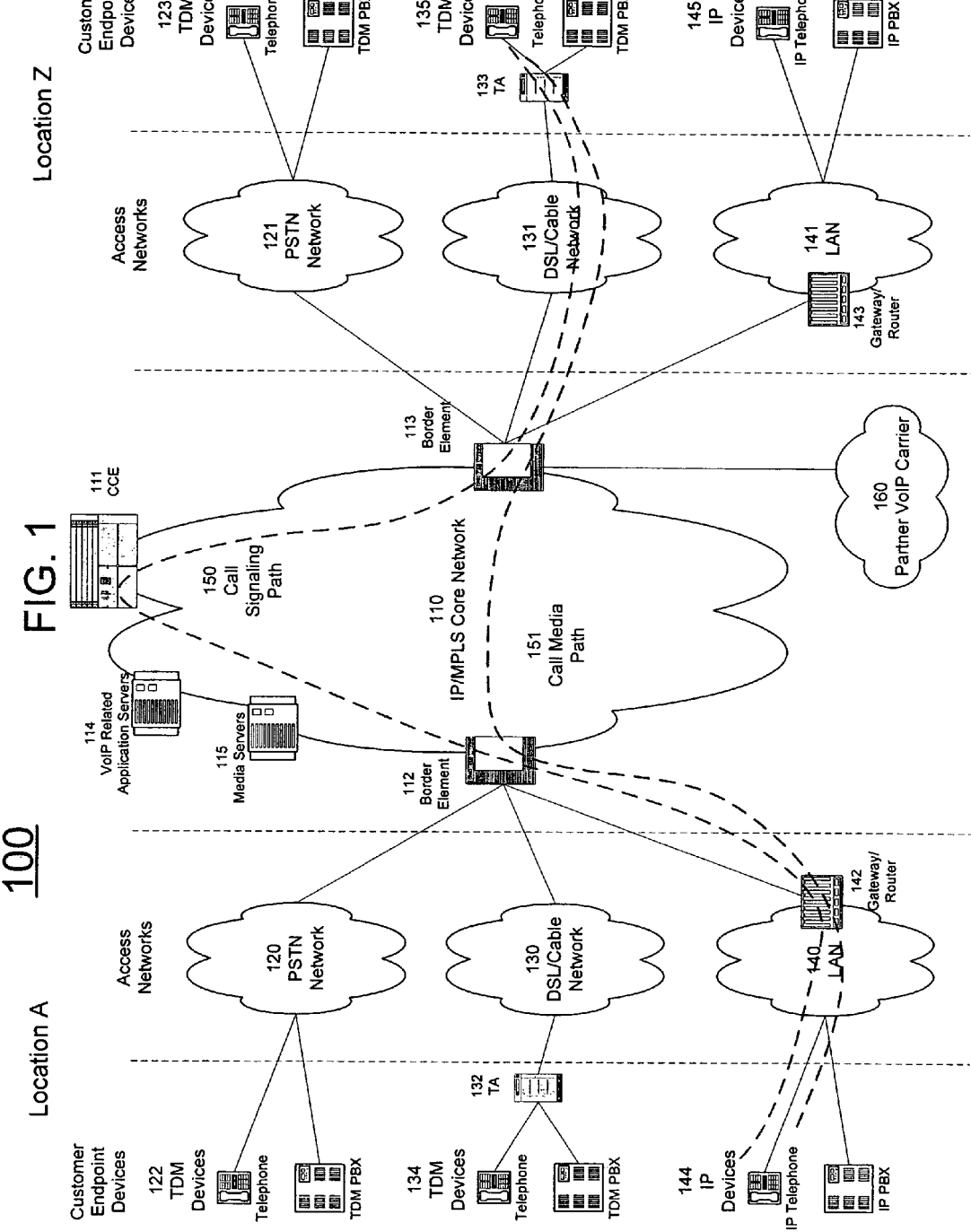
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Calls originating in a VoIP network and destined for a Public Switched Telephone Network (PSTN) endpoint must traverse many network elements in a network before they are successfully established. Network service providers usually provide stringent monitoring and alarming capabilities of network conditions and events that may impact call processing as these calls traverse from an edge network element of a VoIP network to a PSTN. However, many error producing events do occur within the Internet Protocol (IP) network portion of these calls.

To address this need, the present invention provides a method for alarming on all signaling protocol messages that fail in substantial numbers on any particular routes within the IP network. For example, upon receiving these alarms, the network will attempt to identify, and correct the error producing conditions to prevent further call signaling message failures.

Figure 2:
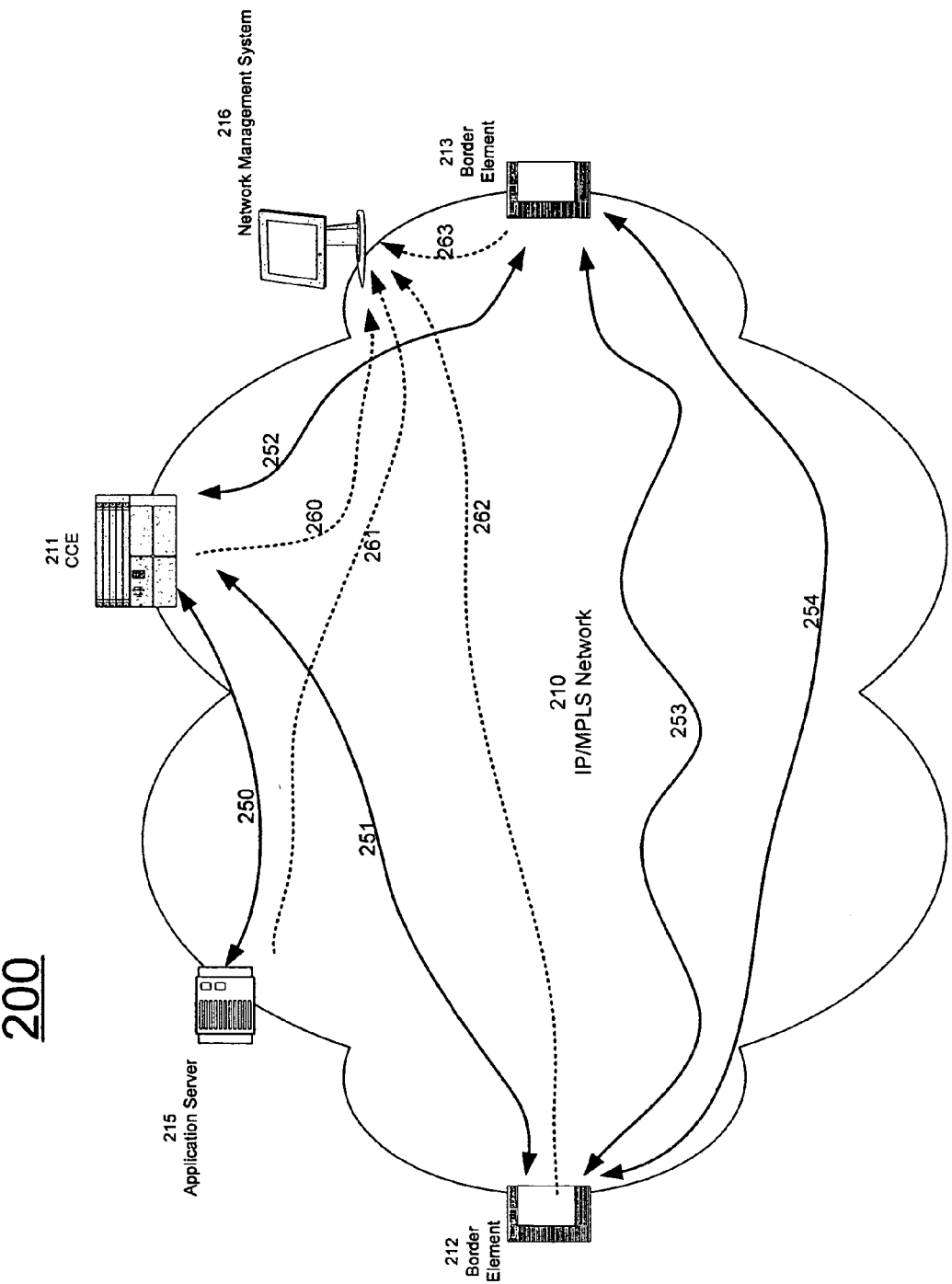
FIG. 2 illustrates an example of providing Internet Protocol call signaling network assurance in a VoIP network of the present invention.

FIG. 2 illustrates an example 200 of providing Internet Protocol call signaling network assurance in a packet network, e.g., a VoIP network of the present invention. In FIG. 2, VoIP network elements are interconnected using the underlying IP/MPLS network 210. For instance, CCE 211 is interconnected to AS 215 via route 250, CCE 211 is interconnected to BE 212 via route 251, CCE 211 is interconnected to BE 213 via route 252, and BE 212 is interconnected to BE 213 via route 253 and route 254. Network Management System (NMS) 216 is responsible for monitoring the health status of these network elements and the routes between these network elements. For instance, NMS 216 continuously monitors the health status of CCE 221 by receiving alarms from CCE 211 using flow 260, the health status of AS 215 by receiving alarms from AS 215 using flow 261, the health status of BE 212 by receiving alarms from BE 212 using flow 262, the health status of BE 213 by receiving alarms from BE 213 using flow 263.

If the received alarms from a network element exceed a predefined alarm threshold, NMS generates an alarm to warn the network operator of the issue. In one embodiment, the predefined alarm threshold can be defined as a ratio of blocked call against the call volume in a predefined period of time. The predefined alarm threshold is a configurable parameter set by the network operator. The network operator then analyzes the root cause of the issue and then performs the necessary corrective actions to remedy the issue. Corrective actions that can be taken by the network operator include, but are not limited to, resetting a call signaling message queue in a particular network element that causes excessive call processing failures, replacing an underlying network link that causes excessive corrupt signaling message, or failing over an active network element that causes excessive call processing errors to a redundant network element of the same type.

Figure 3:
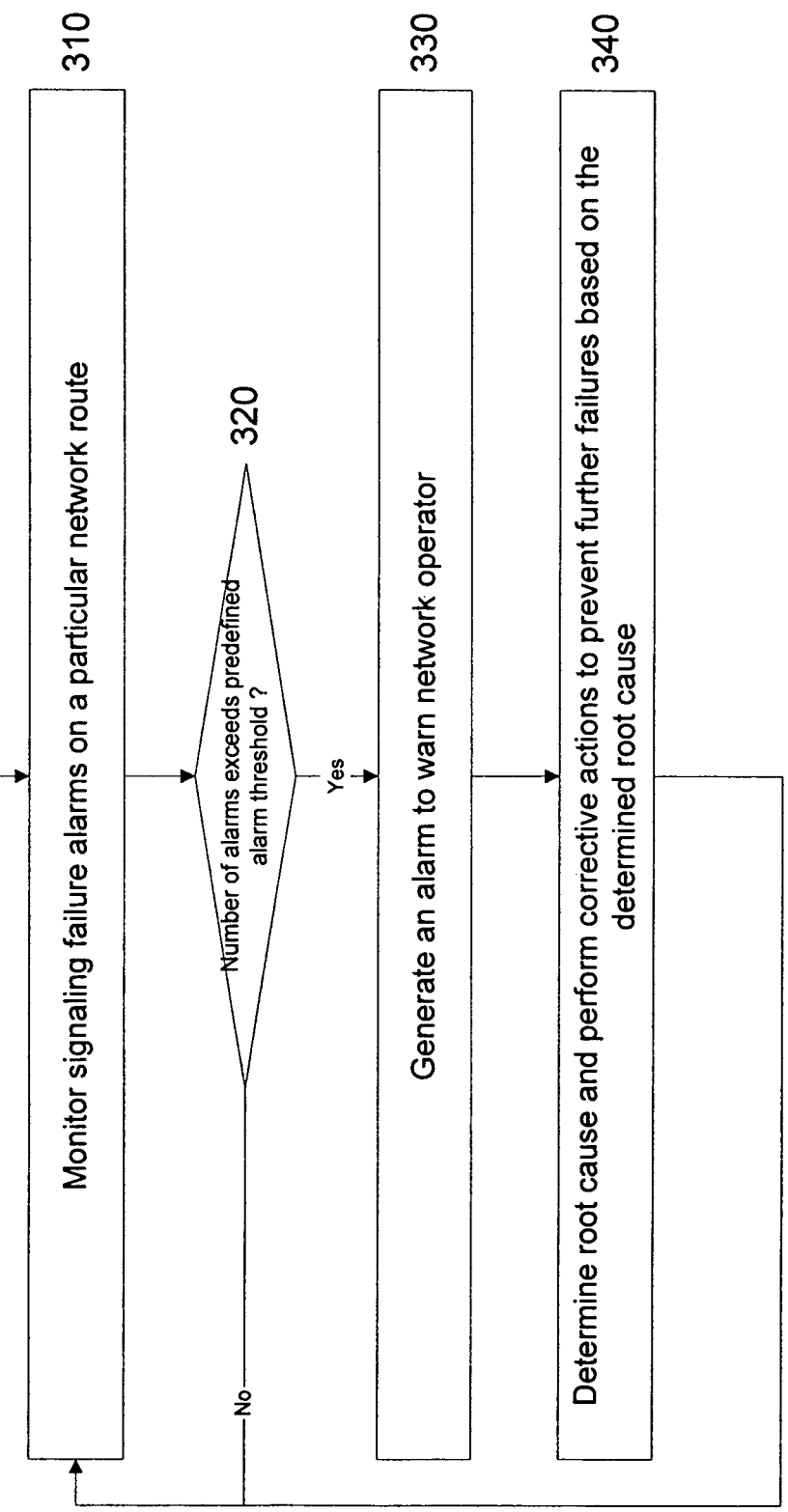
FIG. 3 illustrates a flowchart of a method for providing Internet Protocol call signaling network assurance in a packet network, e.g., a VoIP network, of the present invention.

FIG. 3 illustrates a flowchart of a method 300 for providing Internet Protocol call signaling network assurance in a packet network, e.g., a VoIP network, of the present invention. Method 300 starts in step 305 and proceeds to step 310.

In step 310, the method monitors signaling failure alarms on a particular IP network route connecting two VoIP network elements. The signaling failure alarms are monitored by a NMS.

In step 320, the method checks if the number of alarms received on a monitored IP network route exceeds a predefined alarm threshold. In one embodiment, the predefined alarm threshold can be defined as a ratio of blocked call against the call volume in a predefined period of time. The predefined alarm threshold is a configurable parameter set by the network operator. If the number of alarms received on a monitored route exceeds a predefined alarm threshold, the method proceeds to step 330; otherwise, the method proceeds back to step 310.

In step 330, the method generates an alarm to warn the network operator of a problem. The alarm is generated by the NMS.

In step 340, the method determines the root cause of the problem and performs the necessary corrective actions to remedy the problem. Corrective actions that can be taken by the network operator include, but are not limited to, resetting a call signaling message queue in a particular network element that causes excessive call processing failures, replacing an underlying network link that causes excessive corrupt signaling message, or failing over an active network element that causes excessive call processing errors to a redundant network element of the same type. The method then proceeds back to step 310.

Figure 4:
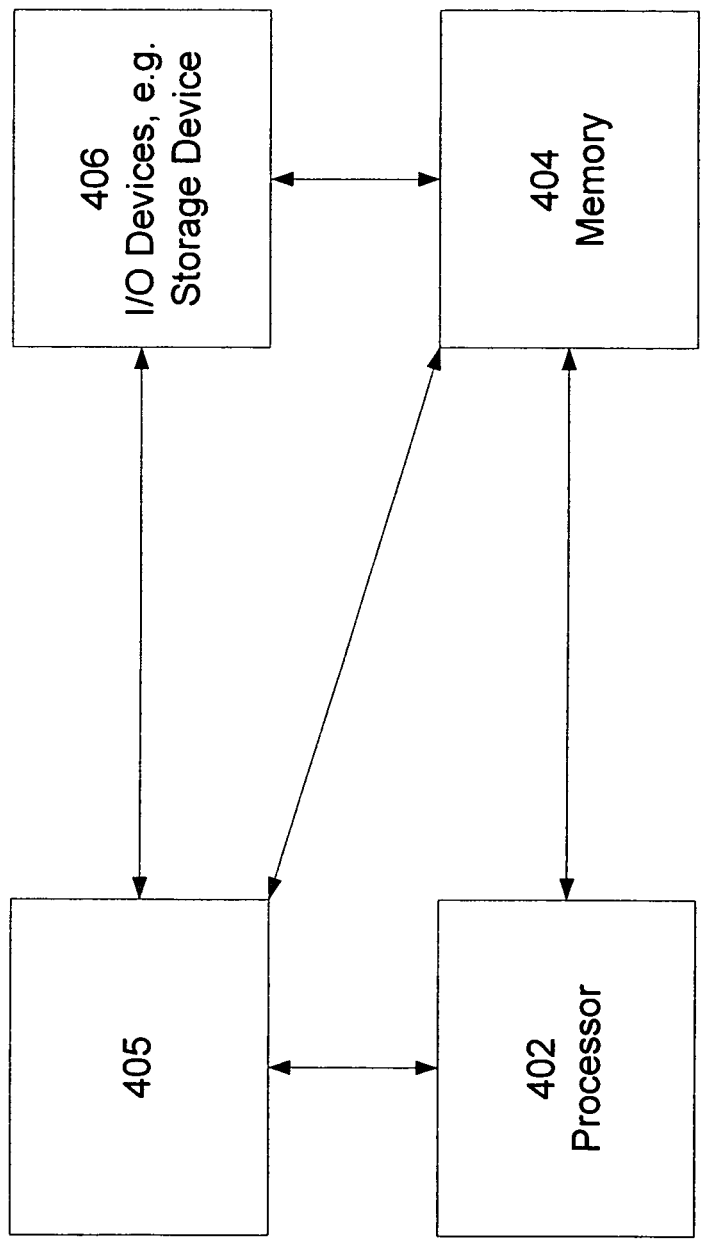
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing Internet Protocol call signaling network assurance, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing Internet Protocol call signaling network assurance can be loaded into memory 404 and executed by processor 402 to implement the functions as discussed above. As such, the present process 405 for providing Internet Protocol call signaling network assurance (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing call signaling network assurance in a communication network, comprising:
   monitoring, by a processor, a health status of a plurality of network elements and network routes that are interconnecting the plurality of network elements in the communication network, wherein the health status of each of the plurality of network elements and the network routes is monitored via signaling failure alarms that are generated by the plurality of network elements and sent from the plurality of network elements, wherein each of the plurality of network elements is used to support a call initiated by a subscriber in the communication network;
   determining, by the processor, if a number of the signaling failure alarms received by for a network element of the plurality of network elements exceeds a predefined alarm threshold, wherein the predefined alarm threshold is a ratio of a number of blocked calls against a call volume in a predefined period of time;
   analyzing, by the processor, the signaling failure alarms after it is determined that the predefined alarm threshold is exceeded; and
   performing, by the processor, a corrective action in the communication network, wherein the corrective action comprises resetting a call signaling message queue.

2. The method of claim 1, wherein the communication network is an internet protocol network.

3. The method of claim 1, wherein the health status of each of the plurality of network elements and the network routes is monitored by a network management system.

4. The method of claim 1, wherein the predefined alarm threshold is a configurable parameter set by a network provider.

5. The method of claim 1, wherein the performing comprises:
   identifying a root cause of the alarm threshold being exceeded; and
   performing the corrective action on a network element that is identified as the root cause of the alarm threshold being exceeded.

6. The method of claim 5, wherein the corrective action further comprises:
   failing over to a redundant network element.

7. A tangible computer-readable medium storing a plurality of instructions which, when executed by a processor, cause the processor to perform operations for providing call signaling network assurance in a communication network, the operations comprising:
   monitoring a health status of a plurality of network elements and network routes that are interconnecting the plurality of network elements in the communication network, wherein the health status of each of the plurality of network elements and the network routes is monitored via signaling failure alarms that are generated by the plurality of network elements and sent from the plurality of network elements, wherein each of the plurality of network elements is used to support a call initiated by a subscriber in the communication network;
   determining if a number of the signaling failure alarms received for a network element of the plurality of network elements exceeds a predefined alarm threshold, wherein the predefined alarm threshold is a ratio of a number of blocked calls against a call volume in a predefined period of time;
   analyzing the signaling failure alarms after it is determined that the predefined alarm threshold is exceeded; and
   performing a corrective action in the communication network, wherein the corrective action comprises resetting a call signaling message queue.

8. The tangible computer-readable medium of claim 7, wherein the communication network is an internet protocol network.

9. The tangible computer-readable medium of claim 7, wherein the health status of each of the plurality of network elements and the network routes is monitored by a network management system.

10. The tangible computer-readable medium of claim 7, wherein the predefined alarm threshold is a configurable parameter set by a network provider.

11. The tangible computer-readable medium of claim 7, wherein the performing comprises:
    identifying a root cause of the alarm threshold being exceeded; and
    performing the corrective action on a network element that is identified as the root cause of the alarm threshold being exceeded.

12. The tangible computer-readable medium of claim 11, wherein the corrective action further comprises:
    failing over to a redundant network element.

13. An apparatus for providing call signaling network assurance in a communication network, comprising:
    a processor; and
    a computer-readable medium storing a plurality of instructions which, when executed by a processor, cause the processor to perform operations, the operations comprising:

monitoring a health status of a plurality of network elements and network routes that are interconnecting the plurality of network elements in the communication network, wherein the health status of each of the plurality of network elements and the network routes is monitored via signaling failure alarms that are generated by the plurality of network elements and sent from the plurality of network elements, wherein each of the plurality of network elements is used to support a call initiated by a subscriber in the communication network;

determining if a number of the signaling failure alarms received for a network element of the plurality of network elements exceeds a predefined alarm threshold, wherein the predefined alarm threshold is a ratio of a number of blocked calls against a call volume in a predefined period of time;

analyzing the signaling failure alarms after it is determined that the predefined alarm threshold is exceeded; and performing a corrective action in the communication network, wherein the corrective action comprises resetting a call signaling message queue.

14. The apparatus of claim 13, wherein the communication network is an internet protocol network.

15. The method of claim 1, wherein the corrective action further comprises:

replacing a network link.

* * * * *